United States Patent
Drak et al.

(10) Patent No.: US 11,890,577 B2
(45) Date of Patent: Feb. 6, 2024

(54) REVERSE OSMOSIS OR NANOFILTRATION PROCESS FOR CLEANING WATER

(71) Applicant: I.D.E. Technologies Ltd., Kadima (IL)

(72) Inventors: Alex Drak, Kadima (IL); Tomer Efrat, Kadima (IL); Roi Zaken, Kadima (IL)

(73) Assignee: IDE WATER TECHNOLOGIES LTD., Kadima (IL)

( * ) Notice: Subject to any disclaimer, the term of this patent is extended or adjusted under 35 U.S.C. 154(b) by 148 days.

(21) Appl. No.: 17/347,643

(22) Filed: Jun. 15, 2021

(65) Prior Publication Data

US 2021/0299612 A1 Sep. 30, 2021

Related U.S. Application Data

(63) Continuation of application No. 15/777,207, filed as application No. PCT/IB2016/054172 on Jul. 13, 2016, now Pat. No. 11,071,949.

(30) Foreign Application Priority Data

Jul. 23, 2015 (GB) ..................................... 1512979

(51) Int. Cl.
*B01D 61/08* (2006.01)
*B01D 61/12* (2006.01)
(Continued)

(52) U.S. Cl.
CPC .............. *B01D 61/08* (2013.01); *B01D 61/02* (2013.01); *B01D 61/025* (2013.01);
(Continued)

(58) Field of Classification Search
CPC ........ B01D 2311/25; B01D 2311/2623; B01D 2311/2626; B01D 2311/268;
(Continued)

(56) References Cited

U.S. PATENT DOCUMENTS 3,776,842 A 12/1973 Grimme
4,165,288 A 8/1979 Teed et al.
(Continued)

FOREIGN PATENT DOCUMENTS

| AU | 2011/338029 A1 | 6/2013 |
|---|---|---|
| CN | 104496083 A | 4/2015 |

(Continued)

OTHER PUBLICATIONS

Bond et al., "Zero Liquid Discharge for Inland Desalination", Report, 2007, The Water Research Foundation, Denver, Colorado, US.

(Continued)

*Primary Examiner* — Dirk R Bass
(74) *Attorney, Agent, or Firm* — FRESH IP PLC; Clifford D. Hyra; Aubrey Y. Chen

(57) ABSTRACT

A system for cleaning feed water of variable quality, the system comprising an inlet for selectively delivering feed water to one or other of at least two feed chambers, each feed chamber having a delivery pipe for delivering feed water to a reverse osmosis or nanofiltration; a pump to deliver the feed water from one of the chambers through its associated delivery pipe to the reverse osmosis or nanofiltration to create a concentrated feed stream and a product water stream; return pipes for selectively returning the concentrated feed stream to one or other of the at least two feed chambers; a product water outlet for removal of the product water; and means for switching the delivery of the concentrated feed stream between the selectable return pipes upon detection of a predetermined reduction in efficiency within one or another of the feed chambers.

19 Claims, 3 Drawing Sheets

(51) Int. Cl.
*C02F 1/44* (2023.01)
*C02F 1/28* (2023.01)
*C02F 1/42* (2023.01)
*B01D 61/02* (2006.01)
*C02F 9/00* (2023.01)
*B01D 61/04* (2006.01)
*C02F 1/00* (2023.01)

(52) U.S. Cl.
CPC .......... *B01D 61/027* (2013.01); *B01D 61/04* (2013.01); *B01D 61/12* (2013.01); *C02F 1/28* (2013.01); *C02F 1/42* (2013.01); *C02F 1/441* (2013.01); *C02F 1/442* (2013.01); *C02F 9/00* (2013.01); *B01D 2311/04* (2013.01); *B01D 2311/08* (2013.01); *B01D 2311/25* (2013.01); *B01D 2311/268* (2013.01); *B01D 2311/2623* (2013.01); *B01D 2311/2626* (2013.01); *B01D 2311/2649* (2013.01); *B01D 2313/10* (2013.01); *C02F 1/004* (2013.01); *C02F 1/008* (2013.01); *C02F 2209/03* (2013.01); *C02F 2209/05* (2013.01); *C02F 2209/40* (2013.01); *C02F 2301/046* (2013.01); *C02F 2303/24* (2013.01)

(58) Field of Classification Search
CPC ............ B01D 2311/04; B01D 2311/08; B01D 2311/2649; B01D 2313/10; B01D 61/02; B01D 61/025; B01D 61/027; B01D 61/04; B01D 61/08; B01D 61/12; C02F 1/004; C02F 1/008; C02F 1/28; C02F 1/42; C02F 1/441; C02F 1/442
See application file for complete search history.

(56) References Cited

U.S. PATENT DOCUMENTS

| | | | |
|---|---|---|---|
| 4,814,086 | A | 3/1989 | Bratt |
| 4,983,301 | A | 1/1991 | Szucz et al. |
| 6,113,797 | A | 9/2000 | Al-samadi |
| 2006/0245909 | A1* | 11/2006 | Stover ................ F04F 13/00 415/1 |
| 2009/0152197 | A1* | 6/2009 | Lilas ................ B01D 61/06 210/636 |
| 2009/0173691 | A1 | 7/2009 | Oklejas |
| 2012/0175303 | A1 | 7/2012 | Gilron et al. |
| 2019/0023595 | A1 | 1/2019 | Grange et al. |

FOREIGN PATENT DOCUMENTS

| | | |
|---|---|---|
| CN | 109205898 A | 1/2019 |
| KR | 101507020 B1 | 4/2015 |

OTHER PUBLICATIONS

Drak et al., "Reverse Osmosis System with High Recovery for Industrial Water Treatment Applications", Conference Paper at The International Desalination Association World Congress, 2017, pp. 1-12, São Paulo, Brazil.

* cited by examiner

REVERSE OSMOSIS OR NANOFILTRATION PROCESS FOR CLEANING WATER

CROSS-REFERENCE TO RELATED APPLICATIONS

This application is a continuation of U.S. application Ser. No. 15/777,207, filed on May 17, 2018, which is a 371 of PCT/IB2016/054172, filed Jul. 13, 2016, which claims the benefit of GB patent application 1512979.4, filed Jul. 23, 2015 each of which is hereby incorporated by reference in its respective entirety as if fully set forth herein.

This invention relates to an improved method and system for the cleaning or desalination of feed water by reverse osmosis (RO) or nanofiltration (NF) in an open circuit.

TECHNICAL FIELD

Desalination by reverse osmosis (RO) occurs when salt water solution is compressed against semi-permeable membranes at a pressure higher than its osmotic pressure. An example of this process is the "Plug-Flow Desalination" method which involves passing of pressurized feed flow through pressure vessels having semi-permeable membranes. The feed then separates into a non-pressurized flow of desalted permeate and a pressurized flow of brine effluent. Generally, the brine effluent is a waste product.

Nanofiltration (NF) is also a semi-permeable membrane filtration-based method that uses nanometer sized cylindrical through-pores. Nanofiltration can be used to treat all kinds of water including ground, surface, and wastewater. Nanofiltration membranes have the ability to remove a significant fraction of dissolved salts.

The recovery rate achieved in the aforementioned processes depends upon the quality of the feed water and applied pressure. Generally, feed water is fed to the system for providing a waste brine stream and a product water stream.

It is an aim of the present invention is to provide an improved method for the cleaning or desalination of feed water by reverse osmosis or nanofiltration in an open circuit that can process feed water of different qualities and deal with different recovery rates.

It is a further aim of the present invention to provide an improved system for the cleaning or desalination of feed water by reverse osmosis or nanofiltration in an open circuit that can process feed water of different qualities and deal with different recovery rates.

SUMMARY OF THE INVENTION

Accordingly, a first aspect of the present invention provides a method of cleaning feed water (FW) of variable quality, the method comprising:
(a) delivering feed water (FW) to one of at least two feed chambers;
(b) pumping feed water from one of the feed chambers through a reverse osmosis (RO) or nanofiltration (NF) membrane to create a concentrated feed stream and a product water stream (PW);
(c) reducing the pressure of the concentrated feed stream;
(d) returning the concentrated feed stream to the original feed chamber for delivery back through the reverse osmosis or nanofiltration;
(e) switching the return delivery of the concentrated feed stream to the at least one other feed chamber upon detecting a predetermined reduction in the efficiency of the RO or NF process within the original feed chamber;
(f) removing the concentrated feed (CW) from the original feed chamber and delivering fresh feed water to this chamber during continuous circulation of the feed water from the at least one other feed chamber through the reverse osmosis or nanofiltration back to the at least one other feed chamber; and
(g) passing the feed stream through a desaturation unit prior to, or after, its passage through the reverse osmosis or nanofiltration Preferably, the method comprises switching delivery of the concentrated feed stream from the at least one other feed chamber to the original feed chamber upon detecting a predetermined reduction in the efficiency of the RO or NF process within the at least one other feed chamber, removing the concentrated feed (CW) from the at least one other feed chamber and delivering fresh feed water (FW) to this chamber.

This enables cleaning of the feed chamber to take place during removal of the concentrated feed stream therefrom, while feed water continues to be fed to the reverse osmosis or nanofiltration chamber from the other feed chamber.

Any appropriate desaturation unit may be used to remove contaminants, such as dissolved salts and sparingly soluble salts from the feed stream prior to, or after, its passage through the reverse osmosis or nanofiltration. Examples include fluidised bed reactors, softeners, ion exchangers and/or an absorber.

The reduction in efficiency of the RO or NF process may be detected in a variety of ways. Preferably, detection of a predetermined maximum salt concentration in the chamber causes switching of the return delivery to the at least one other feed chamber. More preferably, the predetermined maximum salt concentration corresponds to the maximum osmotic pressure at which the reverse osmosis or nanofiltration can operate.

Preferably, the step of reducing the pressure of the concentrated feed stream prior to its return delivery to one or other of the feed chambers reduces the pressure of the concentrated feed stream is reduced to substantially atmospheric pressure. This may be achieved by an open loop wherein the feed stream is passed back to a chamber that is open to atmosphere. Alternatively or additionally, a pressure exchanger may be used to reduce the pressure of the concentrated feed stream. Passing the feed stream through a desaturation unit may occur prior to, or after, this pressure reduction.

The method may also include pre-treating the feed water prior to its delivery to the reverse osmosis or nanofiltration. For example, the pre-treatment may comprise filtering the feed water prior to its delivery to the reverse osmosis or nanofiltration. Furthermore, the filtered feed water may be pumped at high pressure through the membrane.

According to a second aspect of the present invention, there is provided a system for cleaning feed water of variable quality, the system comprising:
(a) an inlet for selectively delivering feed water (FW) to one or other of at least two feed chambers, each feed chamber having a delivery pipe for delivering feed water to a reverse osmosis or nanofiltration;
(b) a pump to deliver the feed water from one of the chambers through its associated delivery pipe to the reverse osmosis (RO) or nanofiltration (NF) membrane to create a concentrated feed stream and a product water stream (PW);

(c) return pipes for selectively returning the concentrated feed stream to one or other of the at least two feed chambers;

(d) a product water outlet for removal of the product water (PW);

(e) means for switching the delivery of the concentrated feed stream between the selectable return pipes upon detection of a predetermined reduction in efficiency of the RO or NF process, such as detection of a maximum salt concentration, within one or other of the feed chambers; and (f) a desaturation unit provided in at least one feed stream between the feed chamber and the reverse osmosis or nanofiltration or in at least one return pipe between the reverse osmosis or nanofiltration and the feed chamber.

The switching means is preferably adapted to enable the delivery of feed water from a first chamber through a first delivery pipe to the reverse osmosis membrane to be recycled through its return pipe to the first chamber until the predetermined reduction in efficiency is detected in that chamber whereupon the switching means enables feed water to be delivered from a second chamber though a second delivery pipe to the reverse osmosis or nanofiltration to be recycled through its return pipe to the second chamber until a predetermined reduction in efficiency is detected in the second chamber.

Preferably, the switching means also activates removal of concentrated feed water from the feed chamber upon detection of the predetermined reduction in efficiency, such as upon detection of a maximum salt concentration within that chamber, and the delivery of fresh feed water to the reverse osmosis or nanofiltration from the other feed chamber.

Additionally, the switching means may activate the delivery of fresh feed water to the chamber following the removal of the concentrated feed stream from that chamber.

The desaturation unit is provided in either the feed streams between the feed chamber and the reverse osmosis or nanofiltration, or in the return pipes between the reverse osmosis or nanofiltration brine and the feed chamber. Any suitable type of desaturation unit may be provided.

Preferably, the system according to the second aspect of the present invention is an open loop system wherein the pressure of the concentrated feed stream in the return pipes is reduced by passing the feed stream to chambers that are open to atmosphere. Additionally or alternatively, a pressure exchanger may be provided within the system. Preferably, the pressure of the concentrated feed stream in the return pipes is reduced to substantially atmospheric pressure. The desaturation unit may be provided between the pressure exchanger and the feed chamber.

The system may include a pre-treatment unit, such as a filter unit, for pre-treating the feed water prior to its delivery to the reverse osmosis or nanofiltration.

BRIEF DESCRIPTION OF THE DRAWINGS

Embodiments of the invention shall now be described, by way of example only, with reference to the accompanying drawings in which.

DETAILED DESCRIPTION

The present invention provides an improved reverse osmosis and/or nanofiltration method and system for enabling variable quality feed water to be used with different recovery rates.

Figure 1:
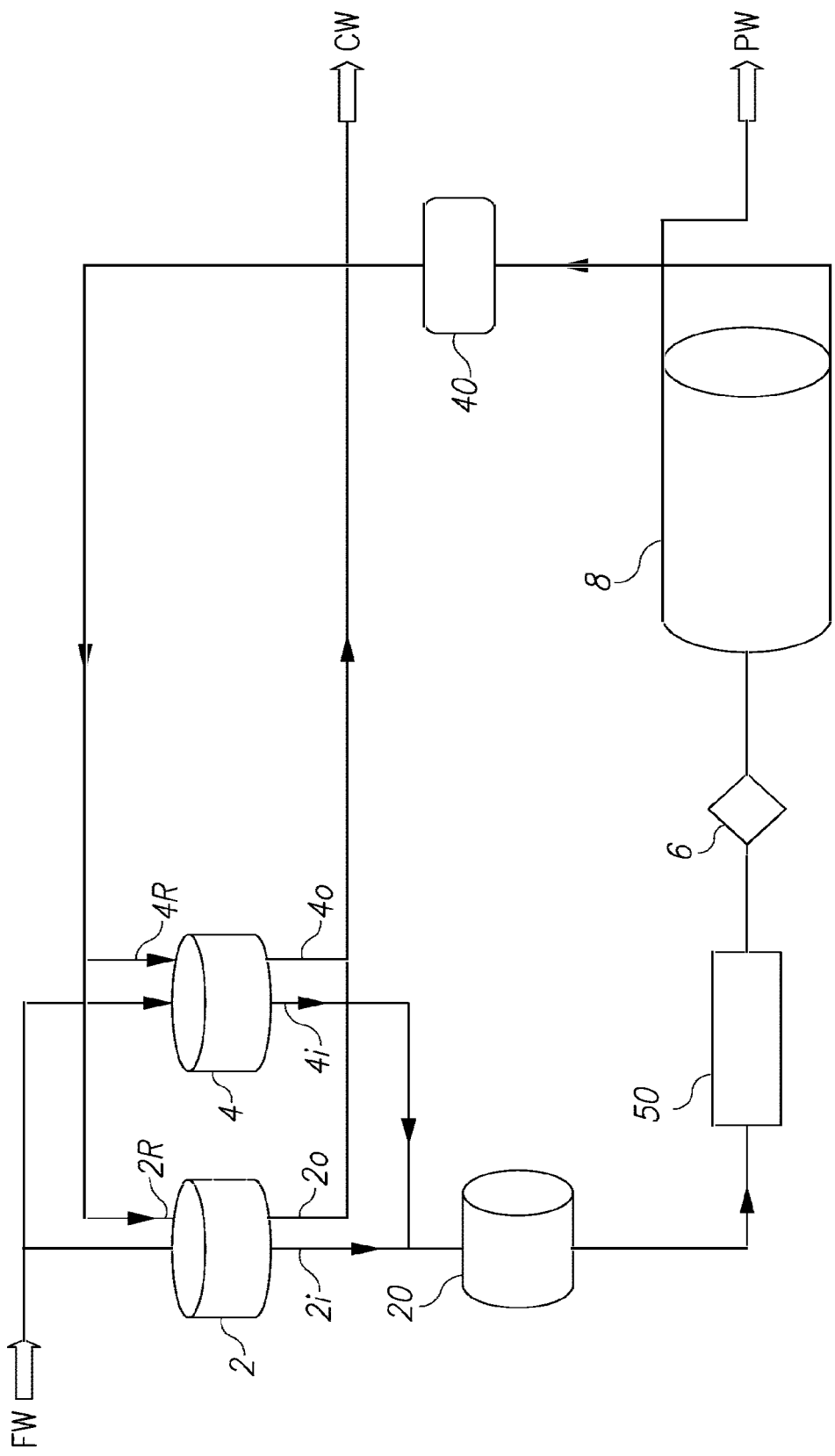
FIG. 1 is a schematic diagram of a water cleaning system according to one embodiment of the present invention.

Referring to FIG. 1 of the accompanying drawings, one embodiment of a system for cleaning feed water of variable quality is illustrated. The embodiment illustrates the invention in relation to a reverse osmosis process and system but a nanofiltration membrane may be used as an alternative to the reverse osmosis membrane. Feed water or salt water (FW) is introduced into a first feed chamber 2 from which it is directed through a delivery pipe 2i to a desaturation unit 20 (for example, in the form of a softener, ion exchanger or an absorber) followed by a pre-treatment unit 50, such as filter unit. A high pressure pump 6 then pressurizes the pre-treated feed water prior to its passage through a reverse osmosis membrane 8 from which product water PW is produced, together with a concentrated brine stream CW. Normally, the brine stream would then be discarded.

In the present invention, the concentrated brine stream CW is delivered back to the first feed chamber via a pressure exchanger 40 in which its pressure is reduced back to substantially atmospheric pressure. The system is also an open loop wherein the chambers are open to atmosphere. The concentrated brine stream is mixed with additional feed water in the first chamber and then recycled back through the system to provide more product water PW and concentrated brine CW for recycling back to the chamber 2.

The system is provided with means for monitoring the efficiency of the reverse osmosis process. In this respect, it is to be appreciated that repeated recycling of the brine stream will reduce the efficiency of the process over time as the concentration of the feed water increases. To address this issue, the system is provided with a second feed chamber 4. When the concentration of the feed water in the first chamber 2 reaches a predetermined level, the delivery pipe 2i is shut and feed water is introduced into the system from a second chamber 4 via delivery pipe 4i. This feed water is then passed through the desaturation unit 20 and pre-treatment unit 50, pumped through the reverse osmosis membrane 8 to provide concentrated brine and product water PW. The concentrated brine is recycled back to the second chamber 4 via the pressure exchanger 40 and a return pipe 4R for recycling through the system with further feed water.

While feed water is being introduced from the second chamber, the highly concentrated brine water CW in the first chamber is removed via outlet pipe 2o. The chamber is cleaned and fresh feed water is introduced into the chamber 2.

The system continues to monitor the efficiency of the reverse osmosis process. Over time, the feed water from the second chamber reaches a predetermined concentration, preferably being around the maximum osmotic pressure at which the reverse osmosis membrane can operate, at which point the inlet 4i of the second chamber is closed and feed water is again delivered through the system from the first chamber 2 back to the first chamber via the pressure exchanger 40 and return pipe 2R. The concentrated brine in the second chamber is removed via outlet 4o and fresh water is delivered into the second chamber 4.

In this manner, the system is able to cope with feed water of different quality and work with different recovery rates.

It is to be appreciated that more than two feed chambers may be provided working consecutively to allow recycling and cleaning of the feed water. Multiple chambers working in consecutive groups may also be provided in the system.

Figure 2:
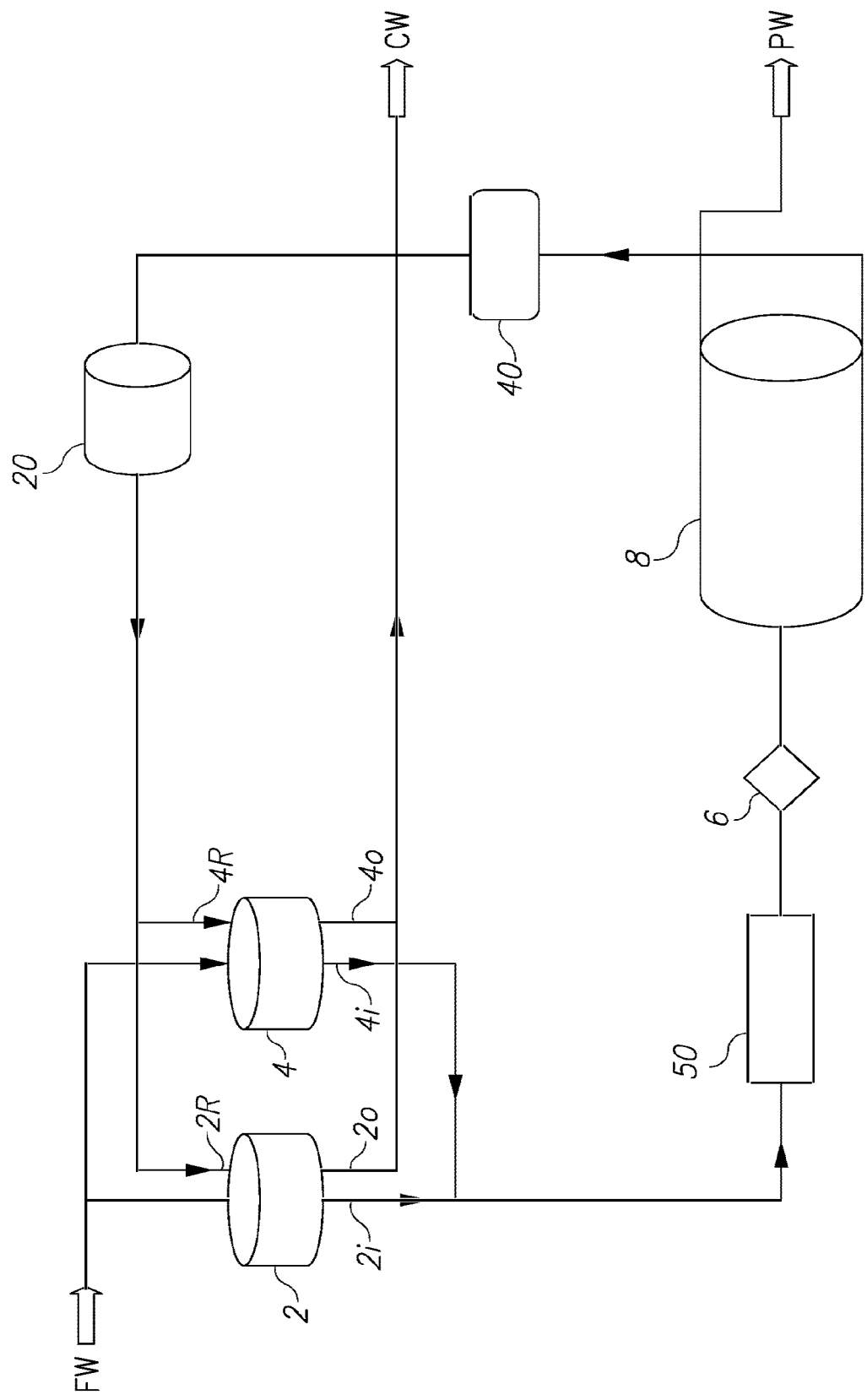
FIG. 2 is a schematic diagram of a water cleaning system according to another embodiment of the present invention.

The desaturation unit (20) may only come into play when the recycled feed water reaches a predetermined salt concentration. Alternatively, the unit may be operational at all times. The unit may be provided elsewhere in the system, for example after the pressure exchanger 40 in the return line, as shown in FIG. 2 of the accompanying drawings.

The system is preferably provided with appropriate electronic control means for automatically switching between delivery of feed water from the respective chambers upon detection of predetermined reduction in the efficiency of the overall process, for example, corresponding to a particular concentration being detected within each feed chamber.

Figure 3:
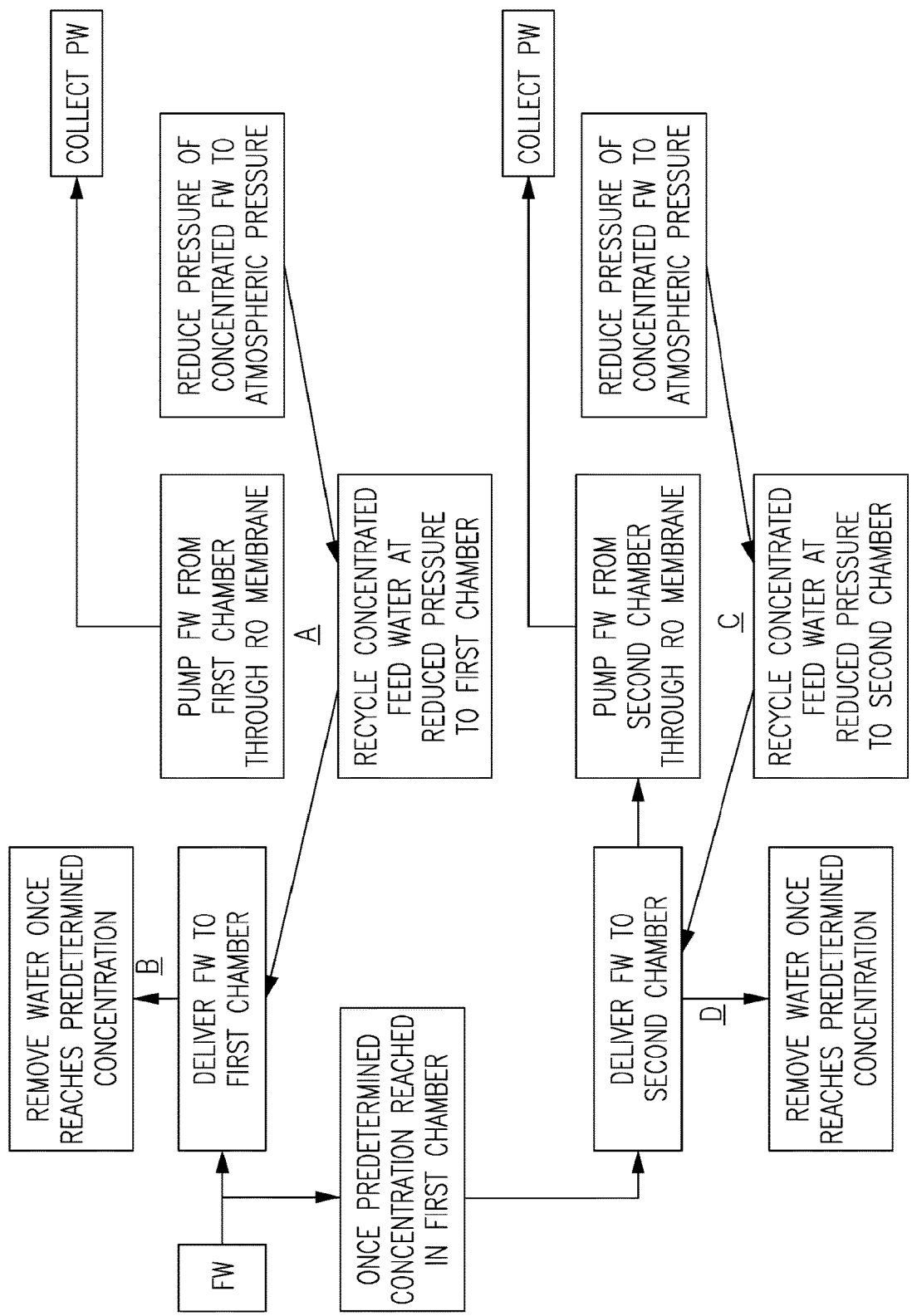
FIG. 3 is a flow diagram illustrating the steps of the method according to a preferred embodiment of the present invention.

FIG. 3 of the accompanying drawings illustrates the basic steps of a method according to the present invention, again described in relation to a reverse osmosis process but the invention is also applicable to nanofiltration. Initially feed water is delivered to a first chamber from which it is pumped through a RO membrane to provide a clean product water PW and a concentrated feed water. The pressure of the concentrated feed water exiting the RO membrane is reduced to atmospheric pressure to that is can be recycled back to the open first chamber for forming part of feed water (see "A" in FIG. 3). This cycle is repeated until the concentration of the feed water in this chamber reaches a predetermined level, at which point the water is removed, the chamber cleaned and fresh water is introduced into the first chamber (see "B").

During removal of the water of the first chamber, feed water is introduced into the system from a second chamber. Again the feed water is pumped through the RO membrane and then recycled back to the second chamber via a pressure exchanger for forming part of the feed water (see "C" in FIG. 3). This cycle is repeated until the concentration of the feed water in this second chamber reaches a predetermined level. The water is then removed, the chamber cleaned and fresh water is introduced into the second chamber (see "D"). During removal of the water, feed water is again introduced from the first chamber and recycled as illustrated by steps A in FIG. 3 until the concentration reaches a predetermined level, at which point feed water is introduced from the second chamber and recycled as illustrated in steps C.

Ideally, the method further includes an additional step of removing the salts from the feed water, either before or after its passage through the RO membrane. This may be achieved using any suitable desaturation unit, such as one containing a softener, ion exchanger or an absorber.

We claim:

1. A system for cleaning feed water of variable quality, the system comprising:
    an inlet for selectively delivering feed water to one or other of at least two feed chambers, each of the at least two feed chambers having an associated delivery pipe for delivering feed water to a reverse osmosis or nanofiltration membrane;
    a pump to deliver the feed water from one or other of the at least two feed chambers through its associated delivery pipe to the reverse osmosis or nanofiltration membrane to create a concentrated feed stream and a product water stream;
    return pipes for selectively returning the concentrated feed stream to one or other of the at least two feed chambers;
    a product water outlet for removal of the product water;
    means for switching the delivery of the concentrated feed stream between the return pipes upon detection of a predetermined reduction in the efficiency of the RO or NF process within one or other of the at least two feed chambers;
    at least one desaturation unit provided in at least one return pipe between the reverse osmosis or nanofiltration brine and one or other of the at least two feed chambers; and
    at least one pressure exchanger for reducing pressure of the concentrated feed stream prior to feeding the concentrated feed stream through the at least one desaturation unit.

2. The system of claim 1, wherein the switching means is adapted to enable the delivery of feed water from a first chamber through a first delivery pipe to the reverse osmosis or nanofiltration to be recycled through its return pipe to the first chamber until the predetermined reduction in efficiency of the RO or NF process is detected in that chamber whereupon the switching means enables feed water to be delivered from a second chamber though a second delivery pipe to the reverse osmosis or nanofiltration to be recycled through its return pipe to the second chamber until the predetermined reduction in efficiency is detected in the second chamber.

3. The system of claim 1, wherein the switching means also activates removal of concentrated feed water from a first feed chamber of the at least two feed chambers upon detection of the predetermined reduction in efficiency of the RO or NF process within the first feed chamber and the delivery of fresh feed water to the reverse osmosis or nanofiltration from a second feed chamber of the at least two feed chambers.

4. The system of claim 3, wherein the switching means activates delivery of fresh feed water to the chamber following the removal of the concentrated feed stream from that chamber.

5. The system of claim 1, wherein the desaturation unit is provided in both feed streams between the feed chamber and the reverse osmosis or nanofiltration and/or in a return pipe between the reverse osmosis or nanofiltration and a feed chamber.

6. The system of claim 5, wherein the desaturation unit is selected from the group consisting of a fluidized bed reactor, a softener, an ion exchanger, an absorber, and combinations thereof.

7. The system of claim 1, further comprising an open loop system wherein the pressure of the concentrated feed stream in the return pipes is reduced by passing the feed stream to chambers that are open to atmosphere.

8. The system of claim 1, wherein the reduction in pressure of the concentrated feed stream is to substantially atmospheric pressure.

9. The system of claim 1, further comprising a pre-treatment unit for pre-treating the feed water prior to its delivery to the reverse osmosis or nanofiltration.

10. The system of claim 9, wherein the pre-treatment unit comprises a filter unit.

11. The system of claim 1, wherein a monitor performs the detection of the predetermined reduction in the efficiency of the RO or NF process.

12. The system of claim 11, wherein the monitor monitors when the feed water from the one or other of the at least two feed chambers reaches a maximum osmotic pressure at which the RO or NF membrane can operate.

13. A system for cleaning feed water, the system comprising:
- a first feed chamber and a second feed chamber, each of the feed chambers for receiving feed water and each of the feed chambers comprising a delivery pipe for delivering the feed water;
- a pump to deliver the feed water from the first feed chamber through the first delivery pipe through a reverse osmosis (RO) or nanofiltration (NF) membrane, thereby generating a concentrated feed stream and a product water stream;
- a first return pipe and a second return pipe, each of the return pipes for selectively returning the concentrated feed stream to the feed chambers;
- a product water outlet for removal of the product water stream;
- a pressure exchanger for reducing pressure of the concentrated feed stream prior to feeding the concentrated feed stream through at least one desaturation unit;
- a switching mechanism for switching delivery of the concentrated feed stream between the first return pipe and the second return pipe upon detection of a predetermined reduction in efficiency of the RO or NF membrane; and
- the at least one desaturation unit provided in at least one of the return pipes between the RO or NF membrane and at least one of the feed chambers,
- wherein the feed water passes through the at least one desaturation unit prior to, or after, its passage through the RO or NF membrane.

14. The system of claim 1, wherein the predetermined reduction occurs when the feed water from the one or other of the at least two feed chambers reaches a predetermined concentration.

15. The system of claim 14, wherein the predetermined concentration occurs when a maximum osmotic pressure at which the RO or NF membrane can operate is reached.

16. The system of claim 13, wherein the pump pressurizes the feed water before delivery through the RO or NF membrane, and wherein the pressure exchanger reduces the pressure of the concentrated feed stream to atmospheric pressure.

17. The system of claim 13, wherein the pressure exchanger is disposed only in the concentrated feed stream.

18. The system of claim 13, further comprising a monitoring unit for monitoring efficiency of the RO or NF membrane, and wherein the monitoring unit performs the detection of the predetermined reduction in efficiency of the RO or NF membrane.

19. The system of claim 13, wherein the switching mechanism is electronically controlled.

* * * * *